(12) United States Patent
Sugino et al.

(10) Patent No.: US 11,231,543 B2
(45) Date of Patent: Jan. 25, 2022

(54) LIGHT EXTRACTION MEMBER

(71) Applicant: NITTO DENKO CORPORATION, Ibaraki (JP)

(72) Inventors: Akiko Sugino, Ibaraki (JP); Kozo Nakamura, Ibaraki (JP); Daisuke Hattori, Ibaraki (JP)

(73) Assignee: NITTO DENKO CORPORATION, Ibaraki (JP)

(*) Notice: Subject to any disclaimer, the term of this patent is extended or adjusted under 35 U.S.C. 154(b) by 0 days.

(21) Appl. No.: 16/778,386

(22) Filed: Jan. 31, 2020

(65) Prior Publication Data

US 2020/0166694 A1  May 28, 2020

Related U.S. Application Data

(63) Continuation-in-part of application No. PCT/JP2018/028518, filed on Jul. 31, 2018.

(30) Foreign Application Priority Data

Aug. 4, 2017 (JP) .............................. JP2017-151389
May 1, 2018 (JP) .............................. JP2018-088040
Jul. 30, 2018 (JP) .............................. JP2018-142100

(51) Int. Cl.
  *F21V 8/00* (2006.01)

(52) U.S. Cl.
  CPC ........... *G02B 6/0063* (2013.01); *G02B 6/004* (2013.01); *G02B 6/0005* (2013.01); *G02B 6/0051* (2013.01); *G02B 6/0065* (2013.01)

(58) Field of Classification Search
  CPC .... G02B 6/005; G02B 6/0065; G02B 6/0063; G02B 6/004; G02B 6/0036; G02B 6/0051; G02B 6/006
  See application file for complete search history.

(56) References Cited

U.S. PATENT DOCUMENTS 6,882,474 B2 * 4/2005 Umemoto ............ G02B 5/3025
                                                         349/62
7,955,531 B1 * 6/2011 Khanarian .......... G02B 6/0036
                                                         264/1.7

(Continued)

FOREIGN PATENT DOCUMENTS

JP   H09-258031 A    10/1997
JP   2015-534100 A   11/2015
JP   2017-068248 A    4/2017

OTHER PUBLICATIONS

International Search Report for corresponding international application PCT/JP2018/028518 dated Oct. 23, 2018.

*Primary Examiner* — Zheng Song
(74) *Attorney, Agent, or Firm* — Hauptman Ham, LLP

(57) ABSTRACT

Provided is a light extraction member which can be obtained at an adequate cost, while achieving desired light output characteristics without requiring complicated design and structure, and which is easily combined with another member, while exhibiting excellent productivity and excellent handling properties. A light extraction member according to the present embodiment includes: a light guide part which has a first main surface being on the light output side and a second main surface being on the reverse side of the first main surface; and a light output control layer which is a predetermined pattern formed on the first main surface. With respect to this light extraction member, the refractive index n1 of the light guide part and the refractive index n2 of the light output control layer satisfy relational expression n1>n2; and the refractive index n2 of the light output control layer is from 1.01 to 1.30.

8 Claims, 4 Drawing Sheets

(56) References Cited

U.S. PATENT DOCUMENTS

| | | | |
|---|---|---|---|
| 10,139,550 B2 | 11/2018 | Thompson et al. | |
| 2004/0022050 A1* | 2/2004 | Yamashita | G02B 6/0021 |
| | | | 362/615 |
| 2013/0075676 A1* | 3/2013 | Purdy | B42D 25/328 |
| | | | 252/586 |
| 2014/0043850 A1* | 2/2014 | Thompson | G02B 6/005 |
| | | | 362/607 |
| 2014/0132883 A1* | 5/2014 | Roberts | G02B 6/006 |
| | | | 349/62 |
| 2015/0131297 A1* | 5/2015 | Thompson | G02B 6/0053 |
| | | | 362/326 |
| 2015/0192728 A1* | 7/2015 | Thompson | G02B 6/0043 |
| | | | 362/624 |
| 2017/0315403 A1* | 11/2017 | Kashiwagi | G02B 6/0055 |

\* cited by examiner

LIGHT EXTRACTION MEMBER

CROSS REFERENCE TO RELATED APPLICATION

This application is based upon and claims the benefit of priority from the prior Japanese Patent Application Nos. 2017-151389 filed on Aug. 4, 2017, 2018-088040 filed on May 1, 2018 and 2018-142100 filed on Jul. 30, 2018. Further, this application is a continuation-in-part Application of International Application No. PCT/JP2018/028518, filed on Jul. 31, 2018. Both of the priority documents are hereby incorporated by reference.

TECHNICAL FIELD

The present invention relates to alight extraction member.

BACKGROUND ART

A light extraction member has been expected to find applications in, for example, a lighting apparatus and an image display apparatus. However, for example, an extremely complicated uneven shape needs to be formed on the surface of a conventional light extraction member, and hence there is a problem in that the design and structure of its light extraction mechanism are extremely complicated. Specifically, to achieve a desired light extraction pattern (including in-plane uniform extraction) in a light guide plate or lighting equipment, a periodic light extraction mechanism pattern needs to be formed for each actual light guide plate unit. Accordingly, when the light guide plate or the lighting equipment is formed in a continuous sheet shape, the patterns need to be formed at predetermined intervals in its lengthwise direction and widthwise direction. Further, in addition to such problem, the conventional light extraction member involves the following problems. It is difficult to composite the member with any other member. The productivity of the member is extremely insufficient. The member is extremely expensive.

CITATION LIST

Patent Literature

[PTL 1] JP H09-258031 A

SUMMARY OF INVENTION

Technical Problem

The present invention has been made to solve the above-mentioned conventional problems, and a primary object of the present invention is to provide a light extraction member having the following features: the member provides a desired light output characteristic without requiring any complicated design and any complicated structure; the member is easily composited with any other member; the member is excellent in productivity; the member is excellent in handleability; and the member can be achieved at appropriate cost.

Solution to Problem

A light extraction member according to an embodiment of the present invention comprises: a light guide portion having a first main surface on a light output side and a second main surface opposite to the first main surface; and a light output control layer arranged in a predetermined pattern on the first main surface of the light guide portion. A refractive index $n1$ of the light guide portion and a refractive index $n2$ of the light output control layer satisfy a relationship of $n1>n2$, and the refractive index $n2$ of the light output control layer is from 1.01 to 1.30.

In one embodiment of the present invention, the light extraction member further comprises a light extraction structure arranged on the light guide portion.

In one embodiment of the present invention, the light extraction member further comprises a light extraction structure arranged on a side of the light output control layer opposite to the light guide portion.

In one embodiment of the present invention, the light extraction member further comprises a pressure-sensitive adhesive layer as an outermost layer on the light output side, wherein a refractive index $n5$ of the pressure-sensitive adhesive layer, the refractive index $n1$ of the light guide portion, and the refractive index $n2$ of the light output control layer satisfy relationships of $n1>n2$, $n5>n2$, and $n1-n2>n1-n5$.

In one embodiment of the present invention, the pressure-sensitive adhesive layer is arranged to cover the light output control layer and to be in contact with the first main surface of the light guide portion.

In one embodiment of the present invention, a distribution of opening portions defining the pattern of the light output control layer is formed to be denser on a side distant from a light source than on the light source side.

In one embodiment of the present invention, the light output control layer is formed of one or a plurality of constituent units each forming a fine porous structure, and the constituent units are chemically bonded to each other through a catalytic action.

In one embodiment of the present invention, the constituent units of the light output control layer are constituent units having at least one shape selected from the group consisting of a particle shape, a fiber shape, a rod shape, and a flat plate shape.

In one embodiment of the present invention, a bond between the constituent units of the light output control layer includes a hydrogen bond or a covalent bond.

In one embodiment of the present invention, the constituent units of the light output control layer each contain an inorganic substance.

In one embodiment of the present invention, the constituent units of the light output control layer are each of a particle shape, and the particle-shaped constituent units contain microporous particles each containing at least one element selected from the group consisting of Si, Mg, Al, Ti, Zn, and Zr.

In one embodiment of the present invention, the microporous particles each contain a pulverized body of a gel-like silica compound.

Effects of Invention

According to the present invention, the light extraction member having the following features can be achieved by forming, on the light guide portion, the light output control layer having a predetermined pattern through, for example, application or printing: the member provides a desired light output characteristic without requiring any complicated design and any complicated structure; the member is easily composited with any other member; the member is excellent in productivity; the member is excellent in handleability;

and the member can be achieved at appropriate cost. In the present invention, when an elongate light guide portion can be formed, after the arrangement of light extraction mechanisms (structures), all of which are identical to each other, in the elongate light guide portion (no periodic structure is required, and hence the mechanisms can be continuously formed even in the case of an uneven shape), the patterned light output control layer can be formed by a simple approach, and hence the light output control layer can be continuously formed on the elongate light guide portion. Therefore, when the elongate light guide portion can be formed, an elongate light extraction member can be achieved. Further, any appropriate bonding means (typically a pressure-sensitive adhesive layer) is easily arranged on the surface of such light output control layer, and hence the light extraction member is easily composited with any other member (typically an optical member).

DESCRIPTION OF EMBODIMENTS

Embodiments of the present invention are described below. However, the present invention is not limited to these embodiments.

A. Overall Configuration of Light Extraction Member

Figure 1:
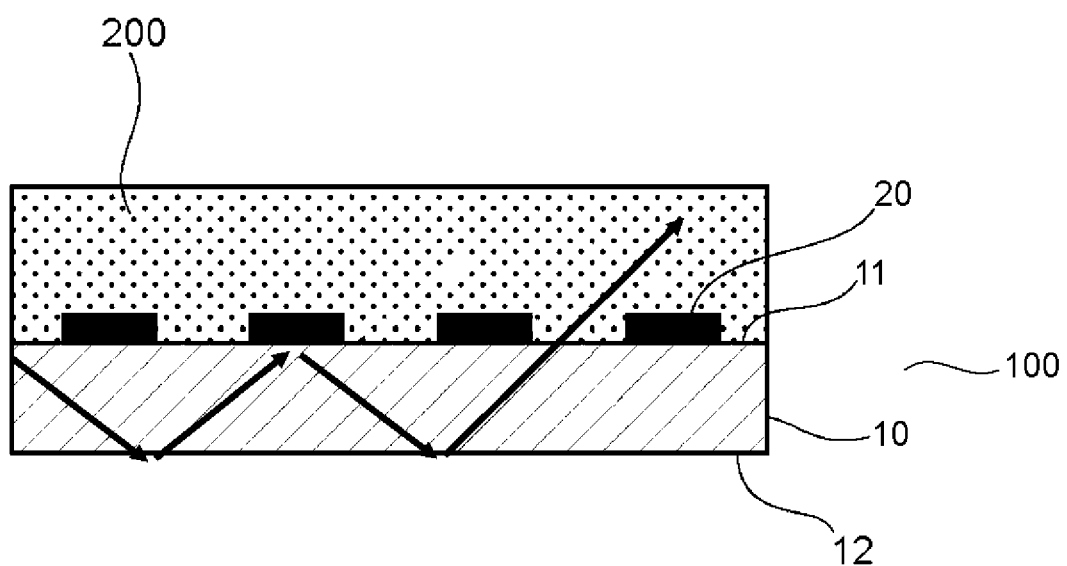
FIG. 1 is a schematic sectional view of a light extraction member according to one embodiment of the present invention.

FIG. 1 is a schematic sectional view of a light extraction member according to one embodiment of the present invention. A light extraction member 100 of this embodiment comprises a light guide portion 10 and a light output control layer 20. The light guide portion 10 has a first main surface 11 on a light output side and a second main surface 12 opposite to the first main surface 11. The light output control layer 20 is arranged in a predetermined pattern on the first main surface 11 of the light guide portion 10. The light output control layer 20 may be arranged on the second main surface 12 (not shown) in addition to the first main surface 11. The light output control layer to be arranged on the second main surface may be arranged in a predetermined pattern, or may be arranged on the entirety of the second main surface. A reflective layer (not shown) may be arranged on the second main surface 12 of the light guide portion 10 as required. The light extraction member 100 may be typically laminated on an adjacent member (not shown) in its use application (e.g., a lighting apparatus or an image display apparatus) via a pressure-sensitive adhesive layer 200. That is, the light extraction member according to the embodiment of the present invention may comprise the pressure-sensitive adhesive layer as the outmost layer on the light output side. The pressure-sensitive adhesive layer is typically arranged on the entire surface on the light output side to cover the light output control layer and to be in contact with the first main surface of the light guide portion through the opening portions of the light output control layer.

The refractive index n1 of the light guide portion 10 and the refractive index n2 of the light output control layer 20 preferably satisfy a relationship of n1>n2. As a result, light can be output (extracted) only from a portion where the light output control layer is not arranged, and hence the light can be output (extracted) only from a desired portion by adjusting the pattern of the light output control layer. Therefore, a desired light output characteristic in accordance with a purpose can be achieved without the design and formation of any complicated three-dimensional structure inside the light guide portion and/or on the surface of the portion.

The refractive index n1 of the light guide portion 10 is preferably 1.47 or more, more preferably from 1.47 to 1.60, still more preferably from 1.47 to 1.55. The refractive index n2 of the light output control layer 20 is preferably 1.30 or less, more preferably 1.20 or less, still more preferably 1.15 or less. The lower limit of the refractive index n2 is, for example, 1.01. A difference between the refractive index n1 and the refractive index n2 is preferably 0.17 or more, more preferably from 0.20 to 0.40, still more preferably from 0.22 to 0.35. The light output characteristic can be more precisely controlled by adjusting the refractive index difference and the pattern of the light output control layer in combination. The refractive index n1 of the light guide portion may be adjusted by appropriately selecting a constituent material for the light guide portion. The refractive index n2 of the light output control layer may be adjusted by appropriately selecting, for example, a constituent material for the layer, the porosity of the layer, and the structures and shapes of the pores thereof. Details about the light guide portion and the light output control layer are described later.

Figure 2A:
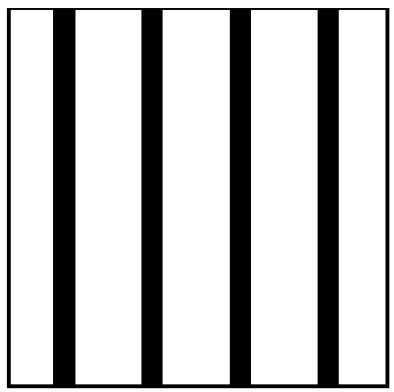
FIG. 2A is a schematic plan view for illustrating some examples of the pattern of a light output control layer in the light extraction member according to the embodiment of the present invention.
Figure 2A:
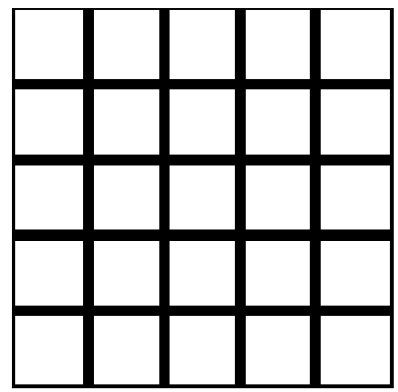
Figure 2A:
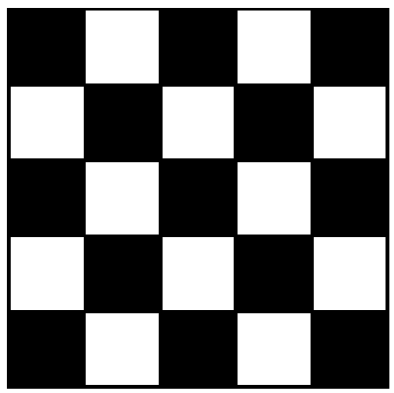
Figure 2A:
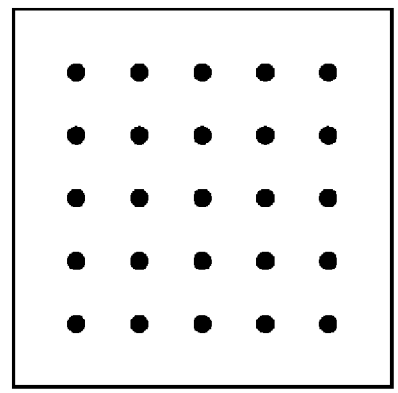
Figure 2A:
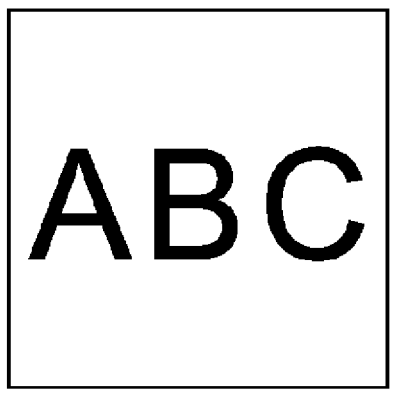
Figure 2A:
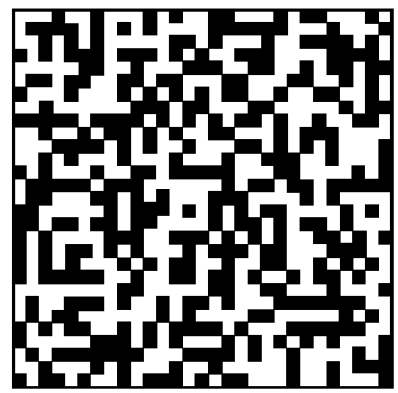
Figure 2B:
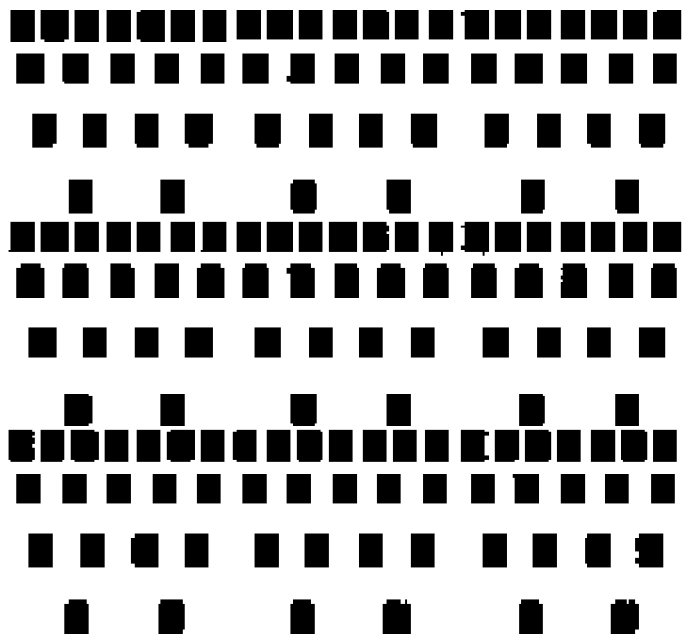
FIG. 2B is a schematic plan view for illustrating another example of the pattern of the light output control layer in the light extraction member according to the embodiment of the present invention.

Any appropriate pattern may be adopted as the pattern of the light output control layer in accordance with a purpose. FIG. 2A and FIG. 2B are schematic plan views for illustrating some examples of the pattern of the light output control layer. Typical examples of the pattern include such a stripe shape, a grid shape, a checkered shape, a dot shape, and a letter as illustrated in FIG. 2A, and such irregular shapes as illustrated in FIG. 2A and FIG. 2B. In each of FIG. 2A and FIG. 2B, black portions are the opening portions of the light output control layer, and its pattern is defined by the opening portions. In addition, in each of FIG. 2A and FIG. 2B, for convenience, a lower side is defined as a light source side. The widths and/or intervals of stripes and grids may be uniform, may be partially different, or may be completely different. Similarly, the areas, shapes, and/or intervals of dots may be all the same, may be partially different, or may be completely different. For example, in the illustrated example, dots having substantially circular shapes and having the same area are arranged at equal intervals, but the shape of each of the dots may be an elliptical shape, may be a triangle, may be a rectangle, may be a polygon, or may be an irregular shape; the areas (sizes) and intervals thereof may be partially or completely different. In one embodiment, as illustrated in FIG. 2B, the distribution of the opening portions of the light output control layer is denser on a side distant from the light source than on the light source side. With such configuration, excellent in-plane uniformity can be achieved. As described later, the light output control layer is formed by, for example, applying or printing a constituent material. Therefore, there is no need to design and form a complicated three-dimensional structure inside the light guide portion and/or on the surface of the portion. As a result, the light extraction member according to the embodiment of the present invention is easily composited with any other member, is excellent in productivity, is excellent in handleability, and is inexpensive.

Herein, the propagation of light in the light extraction member according to the embodiment of the present invention is described with reference to FIG. 1. Light that has entered the light guide portion from a light source (left side of the figure: not shown) propagates through the light guide portion from the left to the right in the figure while being reflected on the second main surface whose interface is in contact with air (refractive index: 1.00) or the reflective layer to be arranged as required, and being reflected on a portion in the first main surface where the light output control layer (having the refractive index n2 smaller than the refractive index n1 of the light guide portion) is formed. In the portion of the first main surface where the light output control layer is not formed, the light that propagates while being repeatedly reflected advances toward the pressure-sensitive adhesive layer without being reflected, and hence the light is output (extracted). That is, according to the light extraction member according to the embodiment of the present invention, the light can be output only from the portion where the light output control layer is not arranged, and hence the light can be output only from a desired portion by adjusting the pattern of the light output control layer. As a result, a desired light output characteristic in accordance with a purpose can be achieved. The foregoing is based on a technical idea different from that of the conventional light extraction member mainly intended to improve extraction efficiency in uniform light extraction. Further, according to the light extraction member according to the embodiment of the present invention, the desired light output characteristic in accordance with the purpose can be achieved by arranging only one such light output control layer as described above. As a result, such advantages as described below can be obtained. (1) A production method is much simpler than a technology involving arranging a plurality of layers having different refractive indices and controlling a relationship between the refractive indices of the layers, and as a result, the light extraction member of the present invention is excellent in production efficiency and is obtained at low cost. This is because, according to the embodiment of the present invention, there is no need to precisely control a relationship between the refractive indices of a plurality of layers, and only the refractive index and pattern of the light output control layer only need to be controlled. (2) The light extraction member of the present invention has an appearance much excellent than that provided by a technology involving arranging a reflective mirror on a light output side for improving light extraction efficiency. This is because no reflective mirror exists, and hence a reflectance when the member is viewed from a viewer side is low, thereby preventing the occurrence of undesired glare or the like. (3) The light extraction member of the present invention is reduced in light loss as compared to the technology involving arranging the reflective mirror described in the (2). That is, the member results in excellent light extraction efficiency as compared to that in the case where the reflective mirror is arranged for improving light extraction efficiency. This is because the light that has escaped from the opening portions defining the pattern of the light output control layer can be extracted as it is, and hence undesired reflection due to the reflective mirror is absent, thereby reducing the light loss.

The refractive index n5 of the pressure-sensitive adhesive layer 200, the refractive index n1 of the light guide portion 10, and the refractive index n2 of the light output control layer 20 satisfy the following relationships: $n1>n2$, $n5>n2$, and $n1-n2>n1-n5$. When the refractive index n5 of the pressure-sensitive adhesive layer, the refractive index n1 of the light guide portion, and the refractive index n2 of the light output control layer satisfy such relationships as described above, a light extraction member having excellent in-plane uniformity can be achieved. A relationship of $n1 \approx n5>n2$ is preferably satisfied. More specifically, the (n1−n2) is preferably as large as possible, and the (n1−n5) is preferably as small as possible. When the (n1−n2) is increased, light can be propagated up to a site more distant from the light source, and hence excellent in-plane uniformity can be achieved. When the (n1−n5) is reduced, light refraction at an interface between the light guide portion and the pressure-sensitive adhesive layer can be suppressed, and hence the pressure-sensitive adhesive layer can be satisfactorily caused to function as an optical waveguide. The refractive index n5 of the pressure-sensitive adhesive layer is preferably from 1.35 to 1.90, more preferably from 1.40 to 1.65. Further, when the pressure-sensitive adhesive layer has such refractive index as described above, and is in contact with the first main surface of the light guide portion as described above, an air layer between the light guide portion and the pressure-sensitive adhesive layer can be eliminated. As a result, the refraction and/or reflection of light from the light guide portion in the air layer can be prevented, and hence the loss of the light to be extracted from the light guide portion can be suppressed to the maximum extent.

Figure 3:
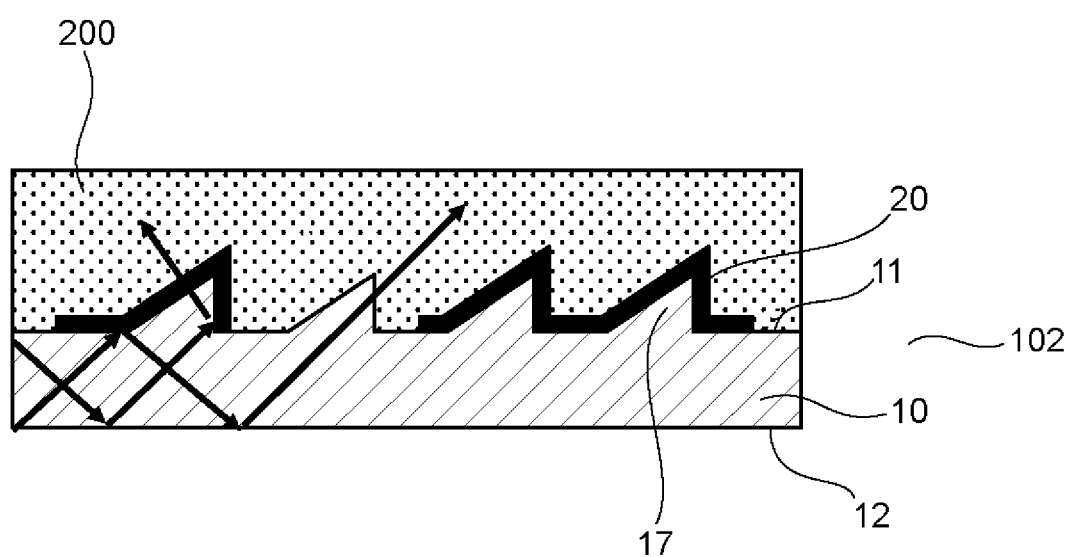
FIG. 3 is a schematic sectional view of a light extraction member according to another embodiment of the present invention.

FIG. 3 is a schematic sectional view of a light extraction member according to another embodiment of the present invention. In a light extraction member 102 of this embodiment, a light extraction structure is further arranged on the light guide portion 10. The light extraction structure of the illustrated example is an uneven portion arranged on the first main surface 11 of the light guide portion 10. In the illustrated example, the uneven portion is formed as a result of the formation of a convex portion 17. The convex portion 17 typically has an optical path-converting function. The shape (e.g., sectional shape) and/or arrangement position of the convex portion may be appropriately set in accordance with a desired optical path-converting function. The uneven portion may be, for example, fine unevenness formed by a surface-roughening treatment. In this embodiment, the light output control layer is arranged to follow the shape of the uneven portion (the convex portion 17 in the illustrated example). The light output characteristic can be more precisely controlled by adjusting a positional relationship between the uneven portion (the convex portion 17 in the illustrated example) and the light output control layer 20, the pattern of the light output control layer, and the shape of the uneven portion (the convex portion 17 in the illustrated example).

Figure 4:
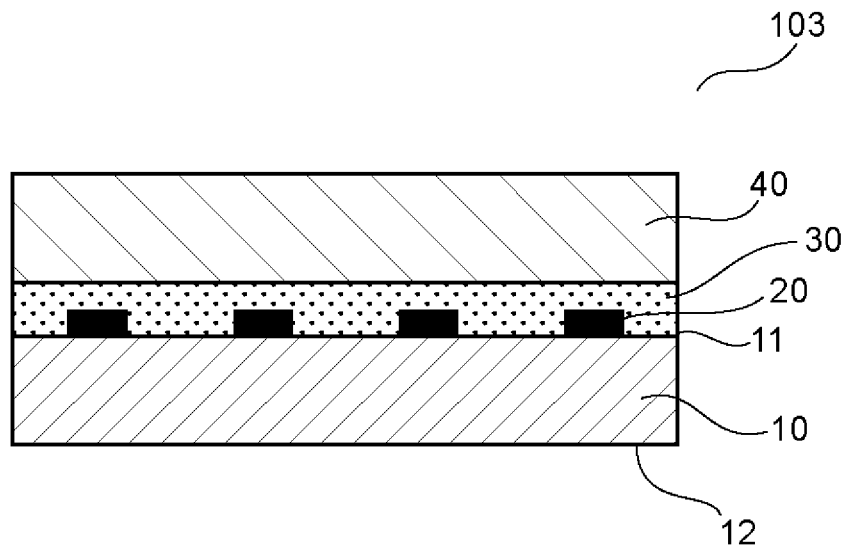
FIG. 4 is a schematic sectional view of a light extraction member according to still another embodiment of the present invention.

FIG. 4 is a schematic sectional view of a light extraction member according to still another embodiment of the present invention. In a light extraction member 103 of this embodiment, a light extraction structure is further arranged on the side of the light output control layer 20 opposite to the light guide portion 10. The light extraction structure of the illustrated example is a light-diffusing layer 40. The light-diffusing layer 40 is arranged via an adhesion layer 30. The adhesion layer 30 may include any appropriate adhesive or pressure-sensitive adhesive. Examples of the adhesive for forming an adhesive layer include an aqueous adhesive, a solvent adhesive, an emulsion-based adhesive, a solvent-free adhesive, an active energy ray-curable adhesive, and a thermosetting adhesive. Examples of the active energy ray-curable adhesive include an electron beam-curable adhesive, a UV-curable adhesive, and a visible light-curable adhesive. Examples of the pressure-sensitive adhesive for forming a pressure-sensitive adhesive layer include an acrylic pressure-sensitive adhesive, a rubber-based pressure-sensitive adhesive, a vinyl alkyl ether-based pressure-sensitive adhesive, a silicone-based pressure-sensitive adhesive, a polyester-based pressure-sensitive adhesive, a polyamide-based pressure-sensitive adhesive, a urethane-based pressure-sensitive adhesive, a fluorine-based pressure-sensitive adhesive, an epoxy-based pressure-sensitive adhesive, and a polyether-based pressure-sensitive adhesive. The pressure-sensitive adhesives may be used alone or in combination thereof. The haze of the pressure-sensitive adhesive is preferably 5% or less, more preferably 1% or less. The acrylic pressure-sensitive adhesive is preferably used in terms of, for example, transparency, processability, and durability. The light-diffusing layer 40 typically contains a matrix containing a resin component and an ultrafine particle component, and light-diffusible fine particles dispersed in the matrix. The refractive indices of the resin component of the matrix and light-diffusible fine particles preferably satisfy the following expression (1):

$$0<|n_P-n_A| \tag{1}$$

in the expression (1), $n_A$ represents the refractive index of the resin component of the matrix, and $n_P$ represents the refractive index of each of the light-diffusible fine particles. The $|n_P-n_A|$ is preferably from 0.01 to 0.10, more preferably from 0.01 to 0.06, particularly preferably from 0.02 to 0.06. Further, the refractive index $n_B$ of the ultrafine particle component satisfies the following expression (2).

$$0<|n_P-n_A|<|n_P-n_B| \tag{2}$$

The $|n_P-n_B|$ is preferably from 0.10 to 1.50, more preferably from 0.20 to 0.80. A detailed configuration of such light-diffusing layer is described as the configuration of a light-diffusing element in, for example, JP 4756100 B2, the description of which is incorporated herein by reference.

As described above, the refractive index n1 of the light guide portion 10 and the refractive index n2 of the light output control layer 20 preferably satisfy a relationship of n1>n2. The refractive index n2 of the light output control layer 20, the refractive index n3 of the adhesion layer 30, and the refractive index n4 of the light-diffusing layer 40 preferably satisfy relationships of n3>n2 and n4>n2. The n1 and the n3 may be equal to each other, the n1 may be larger than the n3, or the n1 may be smaller than the n3.

Figure 5:
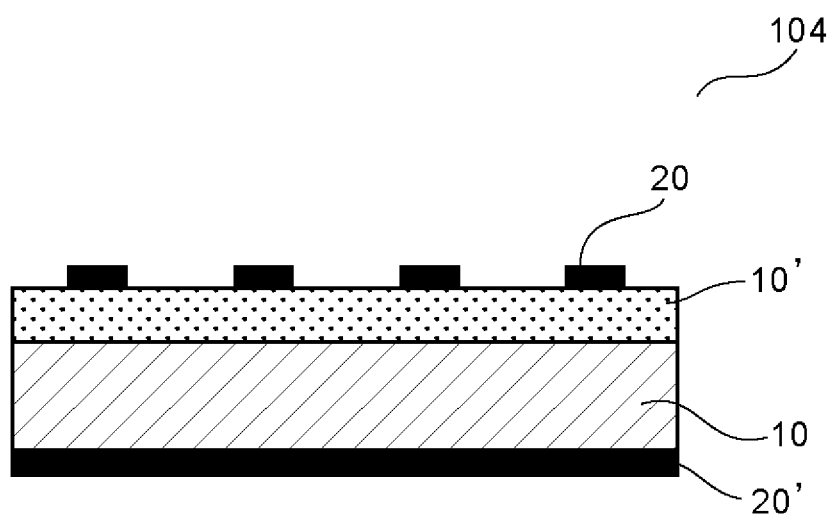
FIG. 5 is a schematic sectional view of a light extraction member according to still another embodiment of the present invention.

FIG. 5 is a schematic sectional view of a light extraction member according to still another embodiment of the present invention. In a light extraction member 104 of this embodiment, the light output control layer 20 is formed on the light guide portion 10 via a pressure-sensitive adhesive layer 10'. Herein, the pressure-sensitive adhesive layer 10' may be recognized as part of the light guide portion 10. Therefore, the phrase "arranged on the first main surface of the light guide" portion as used herein comprehends a case in which the layer is directly arranged on the first main surface and a case in which the layer is arranged thereon via the pressure-sensitive adhesive layer. Further, in this embodiment, another light output control layer 20' is arranged on the second main surface of the light guide portion. Although the other light output control layer 20' is arranged on the entirety of the second main surface of the light guide portion in the illustrated example, the layer may be arranged in any appropriate pattern in accordance with a purpose. Further, a reflective layer or a reflective plate (not shown) may be arranged outside the other light output control layer 20'.

The above-mentioned embodiments may be appropriately combined with each other, modifications well known in the art may be applied to the embodiments, or the embodiments may each be replaced with an optically equivalent configuration. For example, the light guide portion of FIG. 3 and the light-diffusing layer of FIG. 4 may be combined with each other, a prism sheet may be used instead of the light-diffusing layer of FIG. 4, any appropriate light extraction structure (e.g., a predetermined pore portion) may be arranged inside the light guide portion, or such modifications may be combined with each other. Further, the configuration of the light guide portion is not limited to the illustrated examples, and any appropriate light extraction structure in accordance with a purpose may be arranged on the first main surface, on the second main surface, and/or inside the portion. The configuration of the light extraction structure of the light guide portion is described as the shape of a light guide plate in, for example, each of JP 2013-190778 A and JP 2013-190779 A, the description of which is incorporated herein by reference. Another configuration of the light extraction structure of the light guide portion is described in, for example, JP 2013-524288 A (in particular, FIG. 11*a* to FIG. 11*d*), the description of which is also incorporated herein by reference.

B. Light Guide Portion

The light guide portion 10 may be typically formed of a film or plate-shaped product of a resin (preferably a transparent resin). Typical examples of such resin include a thermoplastic resin and a reactive resin (e.g., an ionizing radiation-curable resin). Specific examples of the thermoplastic resin include: (meth)acrylic resins, such as polymethyl methacrylate (PMMA) and polyacrylonitrile; polycarbonate (PC) resins; polyester resins, such as polyethylene terephthalate (PET); cellulose-based resins, such as triacetyl cellulose (TAC); cyclic polyolefin-based resins; and styrene-based resins. Specific examples of the ionizing radiation-curable resin include an epoxy acrylate-based resin and a urethane acrylate-based resin. Those resins may be used alone or in combination thereof.

The thickness of the light guide portion may be, for example, from 100 µm to 100 mm. The thickness of the light guide portion is preferably 50 mm or less, more preferably 30 mm or less, still more preferably 10 mm or less.

As described above, the refractive index n1 of the light guide portion is preferably 1.47 or more, more preferably from 1.47 to 1.60, still more preferably from 1.47 to 1.55. When the refractive index falls within such range, a desired refractive index difference between the refractive index n1 and the refractive index n2 of the light output control layer can be achieved.

C. Light Output Control Layer

The refractive index n2 of the light output control layer is preferably 1.30 or less, more preferably 1.20 or less, still more preferably 1.15 or less. The lower limit of the refractive index n2 is, for example, 1.01. When the refractive index falls within such range, a desired refractive index difference between the refractive index n2 and the refractive index n1 of the light guide portion can be achieved.

Any appropriate configuration may be adopted for the light output control layer as long as the layer has the above-mentioned desired refractive index and is formed through, for example, application or printing. Materials described in, for example, WO 2004/113966 A1, JP 2013-254183 A, and JP 2012-189802 A may each be adopted as a material forming the light output control layer. Specific examples thereof include: silica-based compounds; hydrolyzable silanes, and partial hydrolysates and dehydration condensates thereof; organic polymers; silanol group-containing silicon compounds; active silica obtained by bringing a silicate into contact with an acid or an ion-exchange resin; polymerizable monomers (e.g., a (meth)acrylic monomer and a styrene-based monomer); curable resins (e.g., a (meth)acrylic resin, a fluorine-containing resin, and a urethane resin); and combinations thereof.

The light output control layer typically has pores therein.

The film density of the light output control layer is, for example, 1 g/cm$^3$ or more, preferably 10 g/cm$^3$ or more, more preferably 15 g/cm$^3$ or more. Meanwhile, the film density is, for example, 50 g/cm$^3$ or less, preferably 40 g/cm$^3$ or less, more preferably 30 g/cm$^3$ or less, still more preferably 2.1 g/cm$^3$ or less. The range of the film density is, for example, from 5 g/cm$^3$ to 50 g/cm$^3$, preferably from 10 g/cm$^3$ to 40 g/cm$^3$, more preferably from 15 g/cm$^3$ to 30 g/cm$^3$. Alternatively, the range is, for example, from 1 g/cm$^3$ to 2.1 g/cm$^3$.

The film density may be measured by, for example, such a method as described below. A porous layer (light output control layer) is formed on a substrate (acrylic film), and then the X-ray reflectance of the porous layer in the laminate in a total reflection region is measured with an X-ray diffraction apparatus (manufactured by Rigaku Corporation: RINT-2000).

The size of each of the pores (voids) in the light output control layer refers to a major axis diameter out of the major axis diameter and minor axis diameter of the pore (void). The sizes of the pores (voids) are, for example, from 2 nm to 500 nm. The sizes of the pores (voids) are, for example, 2 nm or more, preferably 5 nm or more, more preferably 10 nm or more, still more preferably 20 nm or more. Meanwhile, the sizes of the pores (voids) are, for example, 500 nm or less, preferably 200 nm or less, more preferably 100 nm or less. The range of the sizes of the pores (voids) is, for example, from 2 nm to 500 nm, preferably from 5 nm to 500 nm, more preferably from 10 nm to 200 nm, still more preferably from 20 nm to 100 nm. The sizes of the pores (voids) may be adjusted to desired sizes in accordance with, for example, a purpose and an application.

The sizes of the pores (voids) may be quantified by a BET test method. Specifically, 0.1 g of the sample (formed porous layer) is loaded into the capillary of a specific surface area-measuring apparatus (manufactured by Micromeritics Instrument Corporation, ASAP 2020), and is then dried under reduced pressure at room temperature for 24 hours so that a gas in its porous structure may be removed. Then, an adsorption isotherm is drawn by causing the sample to adsorb a nitrogen gas, and its pore size distribution is determined. Thus, the pore sizes may be evaluated.

The haze of the light output control layer is, for example, less than 5%, preferably less than 3%. Meanwhile, the haze is, for example, 0.1% or more, preferably 0.2% or more. The range of the haze is, for example, 0.1% or more and less than 5%, preferably 0.2% or more and less than 3%. The haze may be measured by, for example, such a method as described below. The haze is an indicator of the transparency of the light output control layer.

The porous layer (light output control layer) is cut into a size measuring 50 mm by 50 mm, and is set in a haze meter (manufactured by Murakami Color Research Laboratory Co., Ltd.: HM-150), followed by the measurement of its haze. The haze value is calculated from the following equation.

$$\text{Haze (\%)} = [\text{diffuse transmittance (\%)/total light transmittance (\%)}] \times 100 (\%)$$

The light output control layer having the pores therein is, for example, a light output control layer having a porous layer and/or an air layer in at least part thereof. The porous layer typically contains aerogel and/or particles (e.g., hollow fine particles and/or porous particles). The light output control layer may be preferably a nanoporous layer (specifically a porous layer in which the diameters of 90% or more of micropores fall within the range of from $10^{-1}$ nm to $10^3$ nm).

Any appropriate particles may be adopted as the particles. The particles are each typically formed of a silica-based compound. Examples of the shapes of the particles include a spherical shape, a plate shape, a needle shape, a string shape, and a botryoidal shape. String-shaped particles are, for example, particles in which a plurality of particles each having a spherical shape, a plate shape, or a needle shape are strung together like beads, short fiber-shaped particles (e.g., short fiber-shaped particles described in JP 2001-188104 A), and a combination thereof. The string-shaped particles may be linear or may be branched. Botryoidal-shaped particles are, for example, particles in which a plurality of spherical, plate-shaped, and needle-shaped particles aggregate to form a botryoidal shape. The shapes of the particles may be identified through, for example, observation with a transmission electron microscope. The average particle diameter of the particles is, for example, from 5 nm to 200 nm, preferably from 10 nm to 200 nm. When the particles have the above-mentioned configuration, a light output control layer having a sufficiently low refractive index can be obtained, and the transparency of the light output control layer can be maintained. The term "average particle diameter" as used herein means a value determined from the specific surface area (m$^2$/g) of the particles, which is measured by a nitrogen adsorption method (BET method), by the equation "average particle diameter=(2,720/specific surface area)" (see JP H01-317115 A).

The thickness of the light output control layer is preferably from 0.2 µm to 5 µm, more preferably from 0.3 µm to 3 µm. When the thickness of the light output control layer falls within such range, the unevenness of the surface of the light guide portion (substantially the light extraction member) does not become so large as to affect the lamination of the member. Accordingly, in an application where the light extraction member is used, it becomes extremely easy to composite the member with, or to laminate the member on, any other member.

The light output control layer may be formed in a predetermined pattern by applying or printing a composition containing the above-mentioned materials to a predetermined position on the first main surface of the light guide portion as illustrated in, for example, FIG. 1, FIG. 3, or FIG. 4. The application is performed through, for example, a mask having the predetermined pattern. Any appropriate system may be adopted for the printing. Specifically, a printing method may be a plate printing method, such as gravure printing, offset printing, or flexographic printing, or may be a plateless printing method, such as inkjet printing, laser printing, or electrostatic printing. In the embodiment of the present invention, the light output control layer may be formed by any such simple and easy method. Therefore, the design of a complicated three-dimensional structure is not required, and hence a complicated apparatus and a complicated processing procedure for forming such structure are also not required. As a result, the light extraction member according to the embodiment of the present invention is excellent in productivity and inexpensive. Alternatively, the light output control layer may be arranged via a pressure-sensitive adhesive layer as illustrated in, for example, FIG. 5. In this case, the light output control layer may be bonded to the light guide portion after having been formed on a pressure-sensitive adhesive sheet, or the light output control layer formed on any appropriate substrate may be transferred onto the pressure-sensitive adhesive layer of a laminate of "light guide portion/pressure-sensitive adhesive layer". In any case, when the light guide portion is of an elongate shape, the light output control layer may be continuously arranged by, for example, a roll-to-roll process.

In one embodiment, the light output control layer may be applied as a roll body to the light extraction member as described above. The light output control layer may be applied as a roll body of a laminate of the layer and a resin film (substrate) to the light extraction member. A plurality of resin films may be used. Examples of the resin film include inserting paper, a release film, and a surface protective film.

An example of a specific configuration of the light output control layer is described below. The light output control layer of this embodiment is formed of one or a plurality of constituent units each forming a fine porous structure, and the constituent units are chemically bonded to each other through a catalytic action. Examples of the shape of each of the constituent units include a particle shape, a fiber shape, a rod shape, and a flat plate shape. The constituent units may have only one shape, or may have two or more shapes in combination. In the following description, a case in which the light output control layer is a porous layer of a porous body in which the microporous particles are chemically bonded to each other is mainly described.

Such porous layer may be formed by, for example, chemically bonding the microporous particles to each other in a porous layer-forming step. In the embodiment of the present invention, the shapes of the "particles" (e.g., the microporous particles) are not particularly limited. For example, the shapes may each be a spherical shape, or may each be any other shape. In addition, in the embodiment of the present invention, the microporous particles may be, for example, sol-gel beaded particles, nanoparticles (hollow nanosilica nanoballoon particles), or nanofibers. The microporous particles each typically contain an inorganic substance. Specific examples of the inorganic substance include silicon (Si), magnesium (Mg), aluminum (Al), titanium (Ti), zinc (Zn), and zirconium (Zr). Those inorganic substances may be used alone or in combination thereof. In one embodiment, the microporous particles are, for example, microporous particles of a silicon compound, and the porous body is, for example, a silicone porous body. The microporous particles of the silicon compound each contain, for example, a pulverized body of a gel-like silica compound. In addition, another form of the light output control layer having the porous layer and/or the air layer in at least part thereof is, for example, a porous layer having the following features: the layer is formed of fibrous substances, such as nanofibers; and the fibrous substances are entangled with each other to form pores, thereby forming the layer. A method of producing such porous layer is not particularly limited, and is the same as that in the case of, for example, the porous layer of the porous body in which the microporous particles are chemically bonded to each other. Still another form thereof is, for example, a porous layer using hollow nanoparticles or nanoclay, or a porous layer formed by using hollow nanoballoons or magnesium fluoride. The porous layer may be a porous layer formed of a single constituent substance, or may be a porous layer formed of a plurality of constituent substances. The porous layer may include any one of the above-mentioned forms, or may include two or more of the above-mentioned forms.

In this embodiment, the porous structure of the porous body may be, for example, an open-cell structural body in which void structures are continuous with each other. The open-cell structural body means, for example, that the void structures are three-dimensionally continuous with each other in the silicone porous body, and can be said to be a state in which the internal pores of the void structures are continuous with each other. When the porous body has an open-cell structure, its porosity can be increased. However, when closed-cell particles (particles each individually having a void structure), such as hollow silica, are used, an open-cell structure cannot be formed. Meanwhile, for example, when silica sol particles (pulverized products of a gel-like silicon compound that forms sol) are used, the particles each have a three-dimensional dendritic structure, and hence the dendritic particles are sedimented and deposited in a coating film (coating film of the sol containing the pulverized products of the gel-like silicon compound). Accordingly, an open-cell structure can be easily formed. The light output control layer more preferably has a monolith structure in which an open-cell structure includes a plurality of pore size distributions. The monolith structure means, for example, a hierarchical structure including a structure in which nanosized fine pores are present and an open-cell structure in which the nanosized pores assemble. When the monolith structure is formed, both of film strength and a high porosity may be achieved by, for example, imparting the high porosity to the layer through the use of a coarse open-cell pore while imparting the film strength thereto through the use of a fine pore. Such monolith structure may be preferably formed by controlling the pore size distribution of a porous structure to be produced in the gel (gel-like silicon compound) at a stage before its pulverization into the silica sol particles. In addition, the monolith structure may be formed by, for example, controlling the particle size distribution of the silica sol particles after the pulverization to a desired size at the time of the pulverization of the gel-like silicon compound.

The light output control layer contains, for example, the pulverized products of a gel-like compound as described above, and the pulverized products are chemically bonded to each other. The form of the chemical bond (chemical bonding) between the pulverized products in the light output control layer is not particularly limited, and examples thereof include a cross-linking bond, a covalent bond, and a hydrogen bond.

The gel form of the gel-like compound is not particularly limited. The term "gel" generally refers to a state in which the mixture of a solvent and a solute is solidified because the solute loses its independent mobility owing to an interaction between its molecules to have a structure in which the molecules assemble. For example, the gel-like compound may be wet gel or may be xerogel. In general, the wet gel refers to gel which contains a dispersion medium and in which a solute has a uniform structure in the dispersion medium, and the xerogel refers to gel from which a solvent is removed, and in which a solute has a network structure having pores.

The gel-like compound is, for example, a gelled product obtained by causing a monomer compound to gel. The gel-like silicon compound is specifically, for example, a gelled product in which the molecules of a monomer silicon compound are bonded to each other, and the gelled product is specifically, for example, a gelled product in which the molecules of the monomer silicon compound are bonded to each other by a covalent bond, a hydrogen bond, or an intermolecular force. The covalent bond is, for example, a bond formed by dehydration condensation.

The volume-average particle diameter of the pulverized products in the light output control layer is, for example, 0.10 µm or more, preferably 0.20 µm or more, more preferably 0.40 µm or more. Meanwhile, the volume-average particle diameter is, for example, 2.00 µm or less, preferably 1.50 µm or less, more preferably 1.00 µm or less. The range of the volume-average particle diameter is, for example, from 0.10 µm to 2.00 µm, preferably from 0.20 µm to 1.50 µm, more preferably from 0.40 µm to 1.00 µm. The particle size distribution of the pulverized products may be measured with, for example, a particle size distribution-evaluating apparatus based on a dynamic light scattering method, a laser diffraction method, or the like, and an electron microscope, such as a scanning electron microscope (SEM) or a transmission electron microscope (TEM). The volume-average particle diameter is an indicator of a variation in particle size of the pulverized products.

In the particle size distribution of the pulverized products, particles each having a particle diameter of from 0.4 µm to 1 µm may exist at a ratio of, for example, from 50 wt % to 99.9 wt %, preferably from 80 wt % to 99.8 wt %, more preferably from 90 wt % to 99.7 wt %. Alternatively, particles each having a particle diameter of from 1 µm to 2 µm may exist at a ratio of, for example, from 0.1 wt % to 50 wt %, preferably from 0.2 wt % to 20 wt %, more preferably from 0.3 wt % to 10 wt %. The particle size distribution may be measured with, for example, a particle size distribution-evaluating apparatus or an electron microscope. The particle size distribution is also an indicator of a variation in particle size of the pulverized products.

The kind of the gel-like compound is not particularly limited. The gel-like compound is, for example, a gel-like silicon compound. A case in which the gel-like compound is the gel-like silicon compound is described below as an example, but the present invention is not limited thereto.

The above-mentioned cross-linking bond is, for example, a siloxane bond. Examples of the siloxane bond include such a bond T2, a bond T3, and a bond T4 as represented below. When the porous layer (light output control layer) has a siloxane bond, the layer may have any one of the bonds, may have any two of the bonds, or may have all the three of the bonds. As the ratios the T2 and the T3 out of the siloxane bonds become larger, the gel-like compound is richer in flexibility, and hence a characteristic inherent in gel can be expected. Meanwhile, as the ratio of the T4 becomes larger, the film strength of the layer is more easily expressed. Therefore, the ratios of the T2, the T3, and the T4 are preferably changed in accordance with, for example, a purpose, an application, and a desired characteristic.

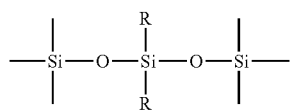
T2

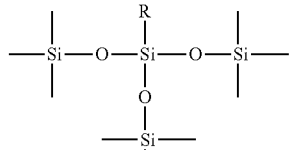
T3

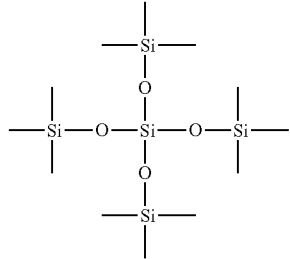
T4

With regard to the ratios of the T2, the T3, and the T4, for example, when the ratio of the T2 is relatively represented as "1", the ratio "T2:T3:T4" may be 1:[1 to 100]:[0 to 50], 1:[1 to 80]:[1 to 40], or 1:[5 to 60]:[1 to 30].

In addition, for example, silicon atoms in the light output control layer (porous layer) are preferably bonded to each other by a siloxane bond. As a specific example, the ratio of unbonded silicon atoms (i.e., residual silanol) out of all the silicon atoms in the porous layer is, for example, less than 50%, preferably 30% or less, more preferably 15% or less.

When the gel-like compound is the gel-like silicon compound, its monomer silicon compound is not particularly limited. The monomer silicon compound is, for example, a compound represented by the below-indicated formula (1). When the gel-like silicon compound is a gelled product in which the molecules of the monomer silicon compound are bonded to each other by a hydrogen bond or an intermolecular force as described above, the molecules of the monomer represented by the formula (1) may be hydrogen-bonded to each other through, for example, their respective hydroxy groups.

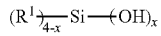
(1)

In the formula (1), X represents, for example, 2, 3, or 4, preferably 3 or 4, $R^1$ represents, for example, a linear or branched alkyl group, and the number of carbon atoms of $R^1$ is, for example, from 1 to 6, preferably from 1 to 4, more preferably 1 or 2. Examples of the linear alkyl group include a methyl group, an ethyl group, a propyl group, a butyl group, a pentyl group, and a hexyl group, and examples of the branched alkyl group include an isopropyl group and an isobutyl group.

The silicon compound represented by the formula (1) is specifically, for example, a compound represented by the below-indicated formula (1') in which X represents 3. In the below-indicated formula (1'), $R^1$ is the same as that in the case of the formula (1), and represents, for example, a methyl group. When $R^1$ represents a methyl group, the silicon compound is tris(hydroxy)methylsilane. When X represents 3, the silicon compound is, for example, a tri-functional silane having three functional groups.

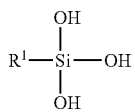

(1')

Another specific example of the silicon compound represented by the formula (1) is a compound in which X represents 4. In this case, the silicon compound is, for example, a tetrafunctional silane having four functional groups.

The monomer silicon compound may be, for example, a hydrolysate of a silicon compound precursor. The silicon compound precursor only needs to be, for example, a precursor capable of producing the silicon compound through hydrolysis, and is specifically, for example, a compound represented by the below-indicated formula (2)

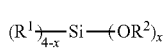

(2)

In the formula (2), X represents, for example, 2, 3, or 4,
$R^1$ and $R^2$ each independently represent a linear or branched alkyl group,
$R^1$ and $R^2$ may be identical to or different from each other,
when X represents 2, $R^1$s may be identical to or different from each other, and
$R^2$s may be identical to or different from each other.

X and $R^1$ are the same as, for example, X and $R^1$ in the formula (1). The examples of $R^1$ in the formula (1) may be incorporated as examples of $R^2$.

The silicon compound precursor represented by the formula (2) is specifically, for example, a compound represented by the below-indicated formula (2') in which X represents 3. In the below-indicated formula (2'), $R^1$ and $R^2$ are the same as those in the case of the formula (2). When $R^1$ and $R^2$ each represent a methyl group, the silicon compound precursor is trimethoxy (methyl) silane (hereinafter sometimes referred to as "MTMS").

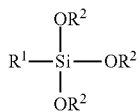

(2')

The monomer silicon compound is preferably a trifunctional silane because of, for example, its excellent low refractive index characteristic. Meanwhile, the monomer silicon compound is preferably a tetrafunctional silane because of, for example, its excellent strength (e.g., scratch resistance). The monomer silicon compounds may be used alone or in combination thereof. For example, the light output control layer may contain only the trifunctional silane as the monomer silicon compound, may contain only the tetrafunctional silane as such compound, may contain both of the trifunctional silane and the tetrafunctional silane as such compounds, or may further contain any other silicon compound as such compound. When two or more silicon compounds are used as the monomer silicon compounds, their ratios are not particularly limited, and may be appropriately set.

An example of a method of forming such light output control layer is described below.

The method typically includes a precursor-forming step of forming a porous structure that is a precursor of the light output control layer (porous layer) on a resin film, and a cross-linking reaction step of causing a cross-linking reaction inside the precursor after the precursor-forming step. The method further includes a containing liquid-producing step of producing a containing liquid containing microporous particles (hereinafter sometimes referred to as "microporous particle-containing liquid" or simply "containing liquid"), and a drying step of drying the containing liquid, and in the precursor-forming step, the microporous particles in the dried body are chemically bonded to each other to form the precursor. The containing liquid is not particularly limited, and is, for example, a suspension containing the microporous particles. In the following description, a case in which the microporous particles are the pulverized products of the gel-like compound, and the porous layer is a porous body (preferably a silicone porous body) containing the pulverized products of the gel-like compound is mainly described. However, the light output control layer may be similarly formed even in the case where the microporous particles are those other than the pulverized products of the gel-like compound.

According to the method, for example, a light output control layer (porous layer) having an extremely low refractive index is formed. A reason therefor is assumed to be, for example, as described below. However, the assumption does not limit the present invention and the method of forming the light output control layer.

The pulverized products are obtained by pulverizing the gel-like silicon compound, and hence the three-dimensional structure of the gel-like silicon compound before the pulverization is brought into a state of being dispersed into three-dimensional basic structures. Further, in the above-mentioned method, the crushed products of the gel-like silicon compound are applied onto the resin film to form a precursor of a porous structure based on the three-dimensional basic structures. In other words, according to the method, new porous structures (three-dimensional basic structures) as a result of the application of the pulverized products, which are different from the three-dimensional structure of the gel-like silicon compound, are formed. Accordingly, in the porous layer to be finally obtained, for example, such a low refractive index that the layer functions to the same extent as an air layer does can be achieved. Further, in the method, the pulverized products are chemically bonded to each other, and hence the three-dimensional basic structures are fixed. Accordingly, the porous layer to be finally obtained can maintain sufficient strength and sufficient flexibility despite the fact that the layer is a structure having pores.

Further, in the above-mentioned method, the precursor-forming step and the cross-linking reaction step are performed as separate steps. In addition, the cross-linking reaction step is preferably performed in a plurality of stages. In the case where the cross-linking reaction step is performed in a plurality of stages, the strength of the precursor is further improved as compared to, for example, that in the case where the cross-linking reaction step is performed in one stage, and hence a light output control layer achieving both of a high porosity and strength can be obtained. Although a mechanism for the foregoing is unclear, the mechanism is assumed to be, for example, as described below. That is, as described above, when the film strength of the porous layer is improved with a catalyst or the like simultaneously with the formation of the porous layer, there is a problem in that the porosity thereof reduces, though the film strength is improved by the advance of a catalytic reaction. This is probably because of, for example, the following reason: a cross-linking reaction between the microporous particles is advanced by the catalyst to increase the number of cross-linkages (chemical bonds) between the microporous particles, and hence a bond between the particles is strengthened, but the entirety of the porous layer condenses to reduce the porosity. In contrast, when the precursor-forming step and the cross-linking reaction step are performed as separate steps, and the cross-linking reaction step is performed in a plurality of stages, for example, the following is conceivable: the number of the cross-linkages (chemical bonds) can be increased while the form of the entirety of the precursor is not changed to a very large extent (e.g., the condensation of the entirety thereof is not caused to a very large extent). However, the foregoing is an example of an assumable mechanism, and hence does not limit the present invention and the method of forming the light output control layer.

In the precursor-forming step, for example, particles each having a certain shape are laminated to form the precursor of the porous layer. The strength of the precursor at the time point is extremely weak. After that, a product capable of chemically bonding the microporous particles to each other (e.g., a strong base catalyst generated from a photo base generator) is generated by, for example, a photoactive or thermally active catalytic reaction (first stage of the cross-linking reaction step). When heat aging (second stage of the cross-linking reaction step) is further performed for advancing the reaction efficiently and in a short time period, the chemical bonding (cross-linking reaction) between the microporous particles may further advance to improve the strength. For example, when the microporous particles are the microporous particles of a silicon compound (e.g., the pulverized bodies of a gel-like silica compound), and residual silanol groups (Si—OH groups) are present in the precursor, the residual silanol groups may be chemically bonded to each other by a cross-linking reaction therebetween. However, the description is also merely an example, and hence does not limit the present invention and the method of forming the light output control layer.

The above-mentioned method includes the containing liquid-producing step of producing the containing liquid containing the microporous particles. When the microporous particles are the pulverized products of the gel-like compound, the pulverized products are obtained by, for example, pulverizing the gel-like compound. As described above, the pulverization of the gel-like compound breaks the three-dimensional structure of the gel-like compound to disperse the structure into the three-dimensional basic structures. An example of the preparation of the pulverized products is as described below.

The gelation of the monomer compound may be performed by, for example, bonding the molecules of the monomer compound to each other through the use of a hydrogen bond or an intermolecular force. The monomer compound is, for example, a silicon compound represented by the formula (1). The silicon compound represented by the formula (1) has a hydroxy group, and hence the molecules of the monomer represented by the formula (1) may be bonded to each other by a hydrogen bond or an intermolecular force through, for example, their respective hydroxy groups.

Alternatively, the silicon compound may be the hydrolysate of the silicon compound precursor described above, and may be produced by, for example, hydrolyzing a silicon compound precursor represented by the formula (2).

A method of hydrolyzing the silicon compound precursor is not particularly limited, and the hydrolysis may be performed by, for example, a chemical reaction in the presence of a catalyst. Examples of the catalyst include acids such as oxalic acid and acetic acid. The hydrolysis reaction may be performed by, for example, slowly dropping and mixing an aqueous solution of oxalic acid into a mixed liquid (e.g., a suspension) of the silicon compound and dimethyl sulfoxide under a room-temperature environment, and then stirring the mixture for about 30 minutes without treating the mixture. At the time of the hydrolysis of the silicon compound precursor, for example, when the alkoxy groups of the silicon compound precursor are completely hydrolyzed, the gelation after the hydrolysis, aging, heating after the formation of the porous structure, and fixation may be more efficiently performed.

The gelation of the monomer compound may be performed by, for example, a dehydration condensation reaction between the molecules of the monomer. The dehydration condensation reaction is preferably performed in the presence of, for example, a catalyst, and examples of the catalyst include dehydration condensation catalysts including: acid catalysts, such as hydrochloric acid, oxalic acid, and sulfuric acid; and base catalysts, such as ammonia, potassium hydroxide, sodium hydroxide, and ammonium hydroxide. Of those dehydration condensation catalysts, a base catalyst is preferred. In the dehydration condensation reaction, the addition amount of the catalyst with respect to the monomer compound is not particularly limited. The catalyst may be added in an amount of, for example, preferably from 0.05 mol to 10 mol, more preferably from 0.1 mol to 7 mol, still more preferably from 0.1 mol to 5 mol with respect to 1 mol of the monomer compound.

The gelation of the monomer compound is preferably performed in, for example, a solvent. The ratio of the monomer compound to the solvent is not particularly limited. Examples of the solvent include dimethyl sulfoxide (DMSO), N-methylpyrrolidone (NMP), N,N-dimethylacetamide (DMAc), dimethylformamide (DMF), γ-butyrolactone (GBL), acetonitrile (MeCN), and ethylene glycol ethyl ether (EGEE). The solvents may be used alone or in combination thereof. The solvent to be used in the gelation is hereinafter sometimes referred to as "solvent for gelation".

Conditions for the gelation are not particularly limited. The temperature at which the solvent containing the monomer compound is treated is, for example, from 20° C. to 30° C., preferably from 22° C. to 28° C., more preferably from 24° C. to 26° C. The time period of the treatment is, for example, from 1 minute to 60 minutes, preferably from 5 minutes to 40 minutes, more preferably from 10 minutes to 30 minutes. When the dehydration condensation reaction is performed, treatment conditions therefor are not particularly limited, and those examples may be incorporated. When the gelation is performed, for example, a siloxane bond grows to form silica primary particles, and as the reaction further advances, the primary particles are strung together like beads to produce gel having a three-dimensional structure.

The gel-like compound obtained by the gelation is preferably subjected to an aging treatment after the gelation reaction. The aging treatment may further grow, for example, the primary particles of the gel having a three-dimensional structure obtained by the gelation to increase the sizes of the particles themselves. As a result, the contact state of a neck portion where the particles are in contact with each other can be changed from point contact to surface contact (the area of contact therebetween can be increased). The gel that has been subjected to the aging treatment is improved in, for example, strength of the gel itself, and as a result, the strength of each of the three-dimensional basic structures after the performance of the pulverization can be improved. Thus, in, for example, the drying step after the application of the pulverized products, the shrinkage of the pore size of the porous structure obtained by the deposition of the three-dimensional basic structures along with the volatilization of the solvent of the application liquid in the drying process can be suppressed.

The aging treatment may be performed by, for example, incubating the gel-like compound at a predetermined temperature for a predetermined time period. The aging temperature is, for example, 30° C. or more, preferably 35° C. or more, more preferably 40° C. or more. Meanwhile, the aging temperature is, for example, 80° C. or less, preferably 75° C. or less, more preferably 70° C. or less. The range of the aging temperature is, for example, from 30° C. to 80° C., preferably from 35° C. to 75° C., more preferably from 40° C. to 70° C. The aging time is, for example, 5 hours or more, preferably 10 hours or more, more preferably 15 hours or more. Meanwhile, the aging time is, for example, 50 hours or less, preferably 40 hours or less, more preferably 30 hours or less. The range of the aging time is, for example, from 5 hours to 50 hours, preferably from 10 hours to 40 hours, more preferably from 15 hours to 30 hours. The aging conditions may be optimized so that, for example, increases in sizes of the silica primary particles and an increase in contact area of the neck portion may be achieved. Further, the boiling point of a solvent that has been used in the treatment is preferably considered. For example, when the aging temperature is excessively high, the solvent may excessively volatilize to cause an inconvenience such as the closing of the fine pores of the three-dimensional porous structure due to the condensation of the concentration of the application liquid (gel liquid). Meanwhile, for example, when the aging temperature is excessively low, an effect exhibited by the aging is not sufficiently obtained. Moreover, a variation in temperature with time in a mass-production process for the light output control layer increases, and hence a light output control layer poor in characteristics may be formed.

For example, the same solvent as that of the gelation treatment may be used in the aging treatment. Specifically, the reaction product after the gelation treatment (i.e., the solvent containing the gel-like compound) is preferably subjected as it is to the aging treatment. The number of moles of residual silanol groups in the gel (the gel-like compound, for example, the gel-like silicon compound) that has finished being subjected to the aging treatment after the gelation is, for example, 50% or less, preferably 40% or less, more preferably 30% or less. Meanwhile, the number of moles of the residual silanol groups is, for example, 1% or more, preferably 3% or more, more preferably 5% or more. The range of the number of moles of the residual silanol groups is, for example, from 1% to 50%, preferably from 3% to 40%, more preferably from 5% to 30%. To improve the hardness of the gel, for example, the number of moles of the residual silanol groups is preferably as small as possible. When the number of moles of the silanol groups is excessively large, for example, it may become impossible to retain the porous structure by the time when the precursor of the silicone porous body is cross-linked. Meanwhile, when the number of moles of the silanol groups is excessively small, there is a risk in that in, for example, the step of producing the microporous particle-containing liquid (e.g., a suspension) and/or any subsequent step, the pulverized products of the gel-like compound cannot be cross-linked, and hence sufficient film strength cannot be imparted to the light output control layer. The number of moles of the residual silanol groups is, for example, the ratio of the residual silanol groups when the number of moles of the alkoxy groups of the raw material for the layer (e.g., the monomer compound precursor) is set to 100. The foregoing is an example of a case in which silanol groups remain, but for example, when the monomer silicon compound is modified with various reactive functional groups, the same matters, conditions, and the like as those described above may also be applied to the respective functional groups.

After the gelation of the monomer compound in the solvent for gelation, the resultant gel-like compound is pulverized. With regard to the pulverization, for example, the gel-like compound in the solvent for gelation may be subjected as it is to the pulverization treatment, or the following may be performed: the solvent for gelation is replaced with any other solvent, and then the gel-like compound in the other solvent is subjected to the pulverization treatment. In addition, for example, when the catalyst and the solvent that have been used in the gelation reaction remain even after the aging step to cause the gelation (pot life) of the liquid with time and a reduction in drying efficiency at the time of the drying step, the solvent for gelation is preferably replaced with the other solvent. The other solvent is hereinafter sometimes referred to as "solvent for pulverization".

The solvent for pulverization is not particularly limited, and for example, an organic solvent may be used. The organic solvent is, for example, a solvent having a boiling point of 130° C. or less, preferably 100° C. or less, more preferably 85° C. or less. Specific examples thereof include isopropyl alcohol (IPA), ethanol, methanol, butanol, propylene glycol monomethyl ether (PGME), methyl cellosolve, acetone, and dimethylformamide (DMF). The solvents for pulverization may be used alone or in combination thereof.

The combination of the solvent for gelation and the solvent for pulverization is not particularly limited, and examples thereof include: a combination of DMSO and IPA; a combination of DMSO and ethanol; a combination of DMSO and methanol; and a combination of DMSO and butanol. When the solvent for gelation is replaced with the solvent for pulverization as described above, in, for example, coating film formation to be described later, a more uniform coating film may be formed.

A method of pulverizing the gel-like compound is not particularly limited, and the pulverization may be performed with, for example, an ultrasonic homogenizer, a high-speed rotation homogenizer, or any other pulverizing apparatus using a cavitation phenomenon. While an apparatus configured to perform media pulverization, such as a ball mill, physically breaks, for example, the porous structure of the gel at the time of the pulverization, a cavitation-type pulverizing apparatus, such as a homogenizer, is of, for example, a media-less system, and hence peels off a bonding surface between silica particles relatively weakly bonded to each other, the particles having already been included in the three-dimensional structure of the gel, with a high-speed shear force. Thus, the gel three-dimensional structure to be obtained may retain, for example, a porous structure having a particle size distribution in a certain range, and hence the porous structure obtained by the deposition at the time of the application and drying of the application liquid may be formed again. Conditions for the pulverization are not particularly limited, and for example, it is preferred that a high-speed flow be instantaneously applied to the liquid to enable the pulverization of the gel without the volatilization of the solvent of the liquid. For example, the gel is preferably pulverized into pulverized products having such a particle size variation (e.g., a volume-average particle diameter or a particle size distribution) as described above. If the amount of work done to the gel, such as a pulverization time or strength, is insufficient, for example, there is a risk in that coarse particles remain to preclude the formation of dense fine pores, and moreover, the number of appearance defects increases to make it impossible to obtain high quality. Meanwhile, when the amount of the work is excessively large, for example, there is a risk in that particles finer than the desired particle size distribution are obtained, and hence the sizes of the pores deposited after the application and the drying become finer to make it impossible to obtain a desired porosity.

As described above, a liquid (e.g., a suspension) containing the microporous particles (pulverized products of the gel-like compound) may be produced. Further, the addition of a catalyst that chemically bonds the microporous particles to each other after the production of the liquid containing the microporous particles or during the production step enables the production of a containing liquid containing the microporous particles and the catalyst. The catalyst may be, for example, a catalyst that accelerates a cross-linking bond between the microporous particles. A dehydration condensation reaction between residual silanol groups in silica sol molecules is preferably utilized as a chemical reaction for chemically bonding the microporous particles to each other. When the reaction between the hydroxy groups of the silanol groups is accelerated with the catalyst, continuous film formation in which the porous structure is cured in a short time period becomes possible. Examples of the catalyst include a photoactive catalyst and a thermally active catalyst. The photoactive catalyst enables a chemical bond (e.g., a cross-linking bond) between the microporous particles without reliance on heating in, for example, the precursor-forming step. According to the foregoing, in, for example, the precursor-forming step, the shrinkage of the entirety of the precursor hardly occurs, and hence a higher porosity can be maintained. In addition, a substance that generates a catalyst (catalyst generator) may be used in addition to the catalyst or instead thereof. For example, a substance that generates a catalyst with light (photocatalyst generator) may be used in addition to the photoactive catalyst or instead thereof, or a substance that generates a catalyst with heat (thermal catalyst generator) may be used in addition to the thermally active catalyst or instead thereof. Examples of the photocatalyst generator include a photobase generator (substance that generates a basic catalyst through light irradiation) and a photoacid generator (substance that generates an acidic catalyst through light irradiation). Of those, a photobase generator is preferred. Examples of the photobase generator include 9-anthrylmethyl N,N-diethylcarbamate (product name: WPBG-018), (E)-1-[3-(2-hydroxyphenyl)-2-propenoyl]piperidine (product name: WPBG-027), 1-(anthraquinon-2-yl)ethyl imidazolecarboxylate (product name: WPBG-140), 2-nitrophenylmethyl 4-methacryloyloxypiperidine-1-carboxylate (product name: WPBG-165), 1,2-diisopropyl-3-[bis(dimethylamino)methylene]guanidium 2-(3-benzoylphenyl)propionate (product name: WPBG-266), 1,2-dicyclohexyl-4,4,5,5-tetramethylbiguanidium n-butyltriphenyl borate (product name: WPBG-300), 2-(9-oxoxanthen-2-yl)propionic acid 1,5,7-triazabicyclo[4.4.0]dec-5-ene (Tokyo Chemical Industry Co., Ltd.), and a compound containing 4-piperidine methanol (product name: HDPD-PB100: manufactured by Heraeus). Each product name including the "WPBG" is a product name of Wako Pure Chemical Industries, Ltd. Examples of the photoacid generator include an aromatic sulfonium salt (product name: SP-170: ADEKA Corporation), a triaryl sulfonium salt (product name: CPI101A: San-Apro Ltd.), and an aromatic iodonium salt (product name: Irgacure 250: Ciba Japan). In addition, the catalyst that chemically bonds the microporous particles to each other is not limited to the photoactive catalyst and the photocatalyst generator, and may be, for example, the thermally active catalyst or the thermal catalyst generator, such as urea. Examples of the catalyst that chemically bonds the microporous particles to each other include: base catalysts, such as potassium hydroxide, sodium hydroxide, and ammonium hydroxide; and acid catalysts, such as hydrochloric acid, acetic acid, and oxalic acid. Of those, abase catalyst is preferred. The catalyst or catalyst generator that chemically bonds the microporous particles to each other may be used, for example, as follows: the catalyst or the catalyst generator is used by being added to a sol particle liquid (e.g., a suspension) containing the pulverized products (microporous particles) immediately before the application of the liquid; or the catalyst or the catalyst generator is used as a mixed liquid obtained by mixing the catalyst or the catalyst generator in a solvent. The mixed liquid may be, for example, an application liquid obtained by directly adding and dissolving the catalyst or the catalyst generator in the sol particle liquid, a solution obtained by dissolving the catalyst or the catalyst generator in the solvent, or a dispersion obtained by dispersing the catalyst or the catalyst generator in the solvent. The solvent is not particularly limited, and examples thereof include water and a buffer solution.

Next, the containing liquid (e.g., a suspension) containing the microporous particles is applied onto, for example, the resin film (hereinafter sometimes referred to as "substrate") or the light guide portion (applying step). For example, various application systems to be described later may each be used in the application, and a system for the application is not limited thereto. Direct application of the containing liquid containing the microporous particles (e.g., the pulverized products of the gel-like silica compound) onto the resin film or the light guide portion may form a coating film containing the microporous particles and the catalyst. The coating film may be referred to as, for example, "coating layer". When the coating film is formed, for example, the pulverized products whose three-dimensional structures have been broken are sedimented and deposited to build a new three-dimensional structure. For example, the containing liquid containing the microporous particles may be free of the catalyst that chemically bonds the microporous particles to each other. For example, as described later, the precursor-forming step may be performed after the catalyst that chemically bonds the microporous particles to each other has been blown onto the coating film, or while the catalyst is blown onto the film. However, the containing liquid containing the microporous particles may contain the catalyst that chemically bonds the microporous particles to each other, and the microporous particles may be chemically bonded to each other through the action of the catalyst in the coating film to form the precursor of the porous body.

The above-mentioned solvent (hereinafter sometimes referred to as "solvent for application") is not particularly limited, and for example, an organic solvent may be used. The organic solvent is, for example, a solvent having a boiling point of 150° C. or less. Specific examples thereof include IPA, ethanol, methanol, n-butanol, 2-butanol, isobutyl alcohol, and pentanol. In addition, the same solvent as the solvent for pulverization may be used. When the method of forming the light output control layer includes the step of pulverizing the gel-like compound, for example, the solvent for pulverization containing the pulverized products of the gel-like compound may be used as it is in the step of forming the coating film.

In the applying step, for example, sol-like pulverized products dispersed in the solvent (hereinafter sometimes referred to as "sol particle liquid") are preferably applied onto the substrate. When the sol particle liquid is subjected to, for example, the chemical cross-linking after its application onto the substrate and its drying, a porous layer having a certain level or more of film strength may be continuously formed. The term "sol" as used in the embodiment of the present invention refers to the following state: when the three-dimensional structure of the gel is pulverized, silica sol particles of nano three-dimensional structures retaining part of the porous structure are dispersed in the solvent to show fluidity.

The concentration of the pulverized products in the solvent for application is not particularly limited, and is, for example, from 0.3% (v/v) to 50% (v/v), preferably from 0.5% (v/v) to 30% (v/v), more preferably from 1.0% (v/v) to 10% (v/v). When the concentration of the pulverized products is excessively high, for example, the fluidity of the sol particle liquid may remarkably reduce to cause an aggregate or an application stripe at the time of its application. When the concentration of the pulverized products is excessively low, for example, there is a risk in that a considerable time period is required for the drying of the solvent of the sol particle liquid, and moreover, the concentration of the residual solvent immediately after the drying increases, and hence the porosity of the light output control layer reduces.

The physical properties of the sol are not particularly limited. The sol has a shear viscosity of, for example, 100 cPa·s or less, preferably 10 cPa·s or less, more preferably 1 cPa·s or less at a shear rate of 1,000 1/s. When the shear viscosity is excessively high, for example, an application stripe may occur to cause an inconvenience such as a reduction in transfer ratio of gravure coating. In contrast, when the shear viscosity is excessively low, for example, there is a risk in that the wet application thickness of the sol at the time of its application cannot be increased, and hence a desired thickness is not obtained after its drying.

The amount of the pulverized products to be applied to the substrate or the light guide portion is not particularly limited, and may be appropriately set in accordance with, for example, a desired thickness of the silicone porous body (consequently, the light output control layer). As a specific example, when a silicone porous body having a thickness of from 0.1 µm to 1,000 µm is formed, the amount of the pulverized products to be applied to the substrate or the light guide portion is, for example, from 0.01 µg to 60,000 µg, preferably from 0.1 µg to 5,000 µg, more preferably from 1 µg to 50 µg per 1 m² of the area of the substrate or the light guide portion. It is difficult to uniquely define a preferred application amount of the sol particle liquid because the amount is related to, for example, the concentration and application system of the liquid. However, the liquid is preferably applied to be as thin a layer as possible in consideration of productivity. When the application amount is excessively large, for example, the liquid is more likely to be dried in a drying furnace before its solvent volatilizes. Thus, before the nano-pulverized sol particles are sedimented and deposited in the solvent to form the porous structure, the solvent may be dried to inhibit the formation of the pores, thereby largely reducing the porosity of the light output control layer. Meanwhile, when the application amount is excessively small, the following risk may be higher: application repelling occurs owing to, for example, the unevenness of the substrate or the light guide portion, or a variation in hydrophilicity or hydrophobicity thereof.

Further, the method of forming the light output control layer includes, for example, the precursor-forming step of forming the porous structure that is the precursor of the porous layer (light output control layer) on the resin film (substrate) or the light guide portion as described above. Although the precursor-forming step is not particularly limited, the precursor (porous layer) may be formed by, for example, the drying step of drying a coating film produced by applying the microporous particle-containing liquid. Through a drying treatment in the drying step, for example, the solvent in the coating film (solvent in the sol particle liquid) is removed. In addition, the sol particles can be sedimented and deposited to form the porous structure during the drying treatment. The temperature of the drying treatment is, for example, from 50° C. to 250° C., preferably from 60° C. to 150° C., more preferably from 70° C. to 130° C. The time period of the drying treatment is, for example, from 0.1 minute to 30 minutes, preferably from 0.2 minute to 10 minutes, more preferably from 0.3 minute to 3 minutes. The temperature and time period of the drying treatment are preferably lower and shorter in relation to, for example, continuous productivity and the expression of a high porosity. When the conditions are excessively severe, in, for example, the case where the liquid is applied to the resin film, there is a risk in that the temperature approaches the glass transition temperature of the resin film to elongate the resin film in a drying furnace, and hence a defect such as a crack occurs in the formed porous structure immediately after the application. Meanwhile, when the conditions are excessively mild, the precursor contains the residual solvent at, for example, the timing at which the precursor leaves the drying furnace, and hence an inconvenience in terms of appearance, such as the occurrence of a scratch flaw, may occur at the time of the rubbing of the precursor with a roll in the next step.

For example, the drying treatment may be natural drying, may be heat drying, or may be drying under reduced pressure. Of those, the heat drying is preferably used when continuous production of the precursor on an industrial scale is presupposed. A method for the heat drying is not particularly limited, and for example, general heating means may be used. Examples of the heating means include a hot-air dryer, a heating roll, and a far-infrared heater. In addition, a solvent having a low surface tension is preferred as the solvent to be used for the purpose of suppressing the occurrence of a shrinkage stress along with the volatilization of the solvent at the time of the drying and the cracking phenomenon of the porous layer (silicone porous body) due to the stress. Examples of the solvent include a lower alcohol typified by isopropyl alcohol (IPA), hexane, and perfluorohexane. In addition, a small amount of a perfluoro-based surfactant or a silicone-based surfactant may be added to IPA or the like described above to reduce its surface tension.

Further, as described above, the method of forming the light output control layer includes the cross-linking reaction step of causing the cross-linking reaction inside the precursor after the precursor-forming step. The basic substance is generated by light irradiation or heating in the cross-linking reaction step, and the cross-linking reaction step is performed in a plurality of stages. At the first stage of the cross-linking reaction step, for example, the microporous particles are chemically bonded to each other through the action of the catalyst (basic substance). Thus, for example, the three-dimensional structures of the pulverized products in the coating film (precursor) are fixed. When the fixation is performed by conventional sintering, for example, a treatment at a temperature as high as 200° C. or more is performed to induce the dehydration condensation of silanol groups and the formation of a siloxane bond. In the formation method, when any one of various additives that catalyze the dehydration condensation reaction is caused to react with the silanol groups, the porous structure may be continuously formed and fixed at a relatively low drying temperature around 100° C. and in a treatment time period as short as less than several minutes without the occurrence of any damage to, for example, the substrate (resin film).

A method for the chemical bonding is not particularly limited, and may be appropriately determined in accordance with, for example, the kind of the gel-like silicon compound. As a specific example, the chemical bonding may be performed by, for example, a chemical cross-linking bond between the pulverized products. In addition to the foregoing, for example, when inorganic particles each formed of titanium oxide or the like are added to the pulverized products, it is conceivable that the inorganic particles and the pulverized products are chemically bonded to each other by a cross-linking bond. In addition, also when the pulverized products are caused to carry a biocatalyst, such as an enzyme, a site different from a catalytic active site of the catalyst and the pulverized products may be chemically bonded to each other by a cross-linking bond. Therefore, the development of the application of the method of forming the light output control layer not only to, for example, the porous layer (silicone porous body) formed of the sol particles but also to an organic-inorganic hybrid porous layer, a host-guest porous layer, or the like is conceivable.

What stage in the method of forming the light output control layer the chemical reaction in the presence of the catalyst is performed (occurs) at is not particularly limited, and the reaction is performed at, for example, at least one stage in the multi-stage cross-linking reaction step. For example, in the method of forming the light output control layer, as described above, the drying step may also serve as the precursor-forming step. In addition, for example, the following may be performed: the multi-stage cross-linking reaction step is performed after the drying step, and the microporous particles are chemically bonded to each other through the action of the catalyst at at least one stage of the step. For example, when the catalyst is a photoactive catalyst as described above, in the cross-linking reaction step, the microporous particles may be chemically bonded to each other by light irradiation to form the precursor of the porous body. In addition, when the catalyst is a thermally active catalyst, in the cross-linking reaction step, the microporous particles may be chemically bonded to each other by heating to form the precursor of the porous body.

The above-mentioned chemical reaction may be performed by, for example, subjecting the coating film containing the catalyst added to the sol particle liquid (e.g., a suspension) in advance to light irradiation or heating, subjecting the coating film to light irradiation or heating after blowing the catalyst onto the film, or subjecting the coating film to light irradiation or heating while blowing the catalyst onto the film. An integrated light quantity in the light irradiation is not particularly limited, and is, for example, from 200 mJ/cm$^2$ to 800 mJ/cm$^2$, preferably from 250 mJ/cm$^2$ to 600 mJ/cm$^2$, more preferably from 300 mJ/cm$^2$ to 400 mJ/cm$^2$ in terms of a wavelength of 360 nm. An integrated light quantity of 200 mJ/cm$^2$ or more is preferred from the viewpoint of preventing the following: the irradiance is not sufficient, and hence the decomposition of the catalyst by its light absorption does not advance, thereby resulting in an insufficient effect. In addition, an integrated light quantity of 800 mJ/cm$^2$ or less is preferred from the viewpoint of preventing the occurrence of a thermal wrinkle due to the application of damage to the substrate under the porous layer. Conditions for the heating treatment are not particularly limited. A heating temperature is, for example, from 50° C. to 250° C., preferably from 60° C. to 150° C., more preferably from 70° C. to 130° C. A heating time is, for example, from 0.1 minute to 30 minutes, preferably from 0.2 minute to 10 minutes, more preferably from 0.3 minute to 3 minutes. Alternatively, the step of drying the sol particle liquid (e.g., a suspension) applied as described above may also serve as the step of performing the chemical reaction in the presence of the catalyst. That is, in the step of drying the applied sol particle liquid (e.g., a suspension), the pulverized products (microporous particles) may be chemically bonded to each other by the chemical reaction in the presence of the catalyst. In this case, the pulverized products (microporous particles) may be further strongly bonded to each other by further heating the coating film after the drying step. Further, it is assumed that the chemical reaction in the presence of the catalyst may occur even in each of the step of producing the microporous particle-containing liquid (e.g., a suspension) and the step of applying the microporous particle-containing liquid. However, the assumption does not limit the present invention and the method of forming the light output control layer. In addition, a solvent having a low surface tension is preferred as the solvent to be used for the purpose of, for example, suppressing the occurrence of a shrinkage stress along with the volatilization of the solvent at the time of the drying and the cracking phenomenon of the porous layer due to the stress. Examples thereof include a lower alcohol typified by isopropyl alcohol (IPA), hexane, and perfluorohexane.

In the method of forming the light output control layer, the cross-linking reaction step is performed in a plurality of stages, and hence the strength of the porous layer (light output control layer) can be further improved as compared to, for example, that in the case where the cross-linking reaction step is performed in one stage. A step corresponding to the second and subsequent stages of the cross-linking reaction step is hereinafter sometimes referred to as "aging step". In the aging step, the cross-linking reaction may be further accelerated inside the precursor by, for example, heating the precursor. Although a phenomenon occurring in the cross-linking reaction step and a mechanism therefor are unclear, the phenomenon and the mechanism are, for example, as described above. In, for example, the aging step, when a heating temperature is set to a low value to cause the cross-linking reaction while suppressing the shrinkage of the precursor, the strength is improved, and hence both of a high porosity and the strength can be achieved. The temperature in the aging step is, for example, from 40° C. to 70° C., preferably from 45° C. to 65° C., more preferably from 50° C. to 60° C. The time period for which the aging step is performed is, for example, from 10 hr to 30 hr, preferably from 13 hr to 25 hr, more preferably from 15 hr to 20 hr.

The light output control layer formed as described above is excellent in strength. Accordingly, the layer may be turned into, for example, a roll-shaped porous body, and hence provides such advantages as follows: the production efficiency of the layer is satisfactory; and the layer is easy to handle.

The light output control layer (porous layer) thus formed may be turned into a laminated structural body including a porous structure by, for example, further laminating the layer together with any other film (layer). In this case, the respective constituents in the laminated structural body may be laminated via, for example, a pressure-sensitive adhesive or an adhesive. The lamination of the respective constituents may be performed by, for example, a continuous treatment (e.g., a so-called roll-to-roll process) involving using an elongate film because of its efficiency, and when the substrate is a formed product, an element, or the like, the constituents may be subjected to a batch treatment before being laminated.

D. Example of Use Mode of Light Extraction Member

An example of the use mode of the light extraction member according to the embodiment of the present invention is briefly described below.

As an example, the light extraction member may be used as the light guide plate of an image display apparatus. As described above, the light output characteristic of the light extraction member may be controlled by adjusting, for example, the pattern of its light output control layer, and hence the optimization of the light output characteristic in accordance with, for example, the purpose and characteristics of the image display apparatus is facilitated. Further, as described above, the light extraction member is easily composited with any other member, and hence in the image display apparatus, the member may be provided as an optical member composited with, for example, a polarizing plate, a retardation plate, a prism sheet, or a light-diffusing element. Such light extraction member, and such optical member obtained by compositing the light extraction member and the other member may be each be used in a lighting apparatus as well.

As another example, the light extraction member may be used as an electronic sign board. For example, when the light extraction member whose light output control layer has been formed in such letter pattern as illustrated in one of FIG. 2 is laminated together with a phosphor, and a light source is turned on, light is output only from a portion other than the letter, and hence an electronic signboard of a display type in which the portion other than the letter shines (i.e., the letter is missing) may be formed. In addition, for example, when the light extraction member whose light output control layer has been formed in a pattern having removed therefrom a company logo or a product logo is laminated together with the phosphor, and the light source is turned on, an electronic signboard of a display type in which the company logo or the product logo shines (i.e., the company logo or the product logo emerges) may be formed.

EXAMPLES

Now, the present invention is specifically described by way of Examples. However, the present invention is not limited to these Examples. Methods of measuring the respective characteristics are as described below.

(1) Refractive Index of Light Output Control Layer

After a light output control layer had been formed on an acrylic film, the resultant was cut into a size measuring 50 mm by 50 mm, and the piece was bonded to the front surface of a glass plate (thickness: 3 mm) via a pressure-sensitive adhesive layer. A central portion (having a diameter of about 20 mm) on the rear surface of the glass plate was daubed with a black marker pen. Thus, a sample in which light was not reflected on the rear surface of the glass plate was obtained. The sample was set in an ellipsometer (manufactured by J.A. Woollam Japan: VASE), and its refractive index was measured under the conditions of a wavelength of 500 nm and an incident angle of from 50° to 80°.

(2) Light Extraction Effect

A commercial tablet having a side light-type LED light source (manufactured by Apple Inc., product name: "i-Pad 2") was dismantled, and a backlight unit was removed therefrom. Next, parts other than a reflective sheet were removed from the backlight unit. A laminate obtained in each of Example and Comparative Examples was incorporated into a backlight portion, and a light source was turned on, followed by the visual observation of the contrast of light from the light incident side of the light source to the terminal portion side thereof.

Production Example 1 Preparation of Application Liquid for Forming Light Output Control Layer (1) Gelation of Silicon Compound 0.95 g of methyltrimethoxysilane (MTMS) that was a precursor of a silicon compound was dissolved in 2.2 g of dimethyl sulfoxide (DMSO). Thus, a mixed liquid A was prepared. 0.5 g of a 0.01 mol/L aqueous solution of oxalic acid was added to the mixed liquid A, and the mixture was stirred at room temperature for 30 minutes so that MTMS was hydrolyzed. Thus, a mixed liquid B containing tris (hydroxy)methylsilane was produced.

0.38 g of 28 wt % ammonia water and 0.2 g of pure water were added to 5.5 g of DMSO, and then the mixed liquid B was further added to the mixture, followed by stirring at room temperature for 15 minutes to perform the gelation of tris(hydroxy)methylsilane. Thus, a mixed liquid C containing a gel-like silicon compound was obtained.

(2) Aging Treatment

An aging treatment was performed by incubating the mixed liquid C containing the gel-like silicon compound, which had been prepared as described above, as it was at 40° C. for 20 hours.

(3) Pulverization Treatment

Next, the gel-like silicon compound subjected to the aging treatment as described above was crushed into granular shapes each having a size of from several millimeters to several centimeters with a spatula. Next, 40 g of isopropyl alcohol (IPA) was added to the mixed liquid C, and the mixture was lightly stirred. After that, the mixture was left at rest at room temperature for 6 hours so that the solvent and the catalyst in the gel were decanted. A similar decantation treatment was performed three times to replace the solvent with IPA. Thus, a mixed liquid was obtained. Next, the gel-like silicon compound in the mixed liquid D was subjected to a pulverization treatment (high-pressure media-less pulverization). The pulverization treatment (high-pressure media-less pulverization) was performed as follows: a homogenizer (manufactured by SMT Co., Ltd., product name: "UH-50") was used, and 1.85 g of the gel-like silicon compound and 1.15 g of IPA in the mixed liquid D were weighed in a 5-cubic centimeter screw bottle, followed by the performance of the pulverization of the mixture under the conditions of 50 W and 20 kHz for 2 minutes.

The gel-like silicon compound in the mixed liquid D was pulverized by the pulverization treatment, and hence the mixed liquid was turned into a sol liquid D' of the pulverized products. A volume-average particle diameter representing a variation in particle size of the pulverized products in the sol liquid D' was determined to be from 0.50 to 0.70 with a dynamic light scattering-type nanotrack particle size analyzer (manufactured by Nikkiso Co., Ltd., UPA-EX150).

Further, a methyl ethyl ketone (MEK) solution of a photo-base generator (Wako Pure Chemical Industries, Ltd.: product name: WPBG-266) having a concentration of 1.5 wt % and a MEK solution of bis(trimethoxysilyl)ethane having a concentration of 5% were added at ratios of 0.062 g and 0.036 g, respectively to 0.75 g of the sol liquid (mixed liquid D'). Thus, an application liquid for forming a light output control layer was obtained.

Example 1

The application liquid for forming a light output control layer prepared in Production Example 1 was applied to an acrylic plate having a thickness of 0.55 mm. At this time, the application liquid for forming a light output control layer was applied as follows: the liquid was not applied to the entire surface of the acrylic plate, but was applied through a mask so that a surface to which the liquid was applied and a surface to which the liquid was not applied were arranged at intervals of 3 cm (i.e., a stripe shape having a width of 3 cm was formed) from the end portion of the plate. At this time, the applied layer thus formed had a wet thickness (thickness before its drying) of about 27 μm. The applied layer was treated at a temperature of 100° C. for 1 minute to be dried, and the applied layer after the drying was irradiated with UV light having a wavelength of 360 nm in a light irradiance (energy) of 300 mJ/cm². Thus, a laminate having a configuration of "acrylic plate/light output control layer" was obtained. The light output control layer had a refractive index of 1.15.

Next, an acrylic pressure-sensitive adhesive having a refractive index of 1.47 was bonded to the laminate, and a light-diffusing layer having a haze of 99%, which had been produced with reference to JP 4756100 B2, was bonded to its pressure-sensitive adhesive surface. Thus, an optical laminate A was obtained.

As described above, the laminate A (light-diffusing layer/pressure-sensitive adhesive/light output control layer (not on the entire surface but on part of the surface)/acrylic plate) including the light output control layer formed in a specific portion and the light-diffusing layer was obtained. The resultant laminate A was subjected to the evaluation (2). The result is shown in Table 1.

Comparative Example 1

A laminate B (light-diffusing layer/pressure-sensitive adhesive/acrylic plate) was obtained in the same manner as in Example 1 except that the light output control layer was not formed. The resultant laminate B was subjected to the evaluation (2). The result is shown in Table 1.

Comparative Example 2

A laminate C (light-diffusing layer/pressure-sensitive adhesive/low-refractive index layer (entire surface)/acrylic plate) was obtained in the same manner as in Example 1 except that a low-refractive index layer (wet thickness: about 27 μm) was formed on the entire surface of the acrylic plate by using the application liquid for forming a light output control layer prepared in Production Example 1. The resultant laminate C was subjected to the evaluation (2). The result is shown in Table 1.

TABLE 1

| | Light output control layer | Forming region | Light extraction effect |
|---|---|---|---|
| Example 1 | Present | Pattern | ○ Light is satisfactorily extracted only from a required region. |
| Comparative Example 1 | Absent | — | × Light is used up on the light incident side. |
| Comparative Example 2 | The low-refractive index layer is formed on the entire surface. | | × Light cannot be satisfactorily output. |

As is apparent from Table 1, according to Example of the present invention, a desired light output characteristic (light extraction effect) in accordance with a purpose can be achieved by arranging the light output control layer in a pattern on the layer having a light extraction mechanism (the acrylic plate in this case). Meanwhile, in Comparative Example 1, the light output control layer is not formed, and hence the pressure-sensitive adhesive covers the entirety of the light output surface of the acrylic plate. As a result, air and the light output control layer are absent on the light output surface side. Accordingly, the light is not satisfactorily reflected at an interface on the light output surface side, and hence cannot propagate through the inside of the acrylic plate. In Comparative Example 2, the low-refractive index layer is formed on the entirety of the light output surface of the acrylic plate. Accordingly, the light cannot be satisfactorily output from the light output surface, and hence the light propagates through the inside of the acrylic plate to escape from the end surface of the acrylic plate opposite to its light incident surface.

Further, as is understood from the above-mentioned results, according to the present invention, an appropriate light output characteristic in accordance with a purpose can be achieved by adjusting the pattern of the light output control layer. As a result, the present invention may be applied to any appropriate light guide portion in accordance with the purpose (e.g., a light guide portion or optical waveguide having arranged therein any appropriate light extraction structure). Further, the desired light output characteristic is obtained without the requirement of any complicated optical design and any complicated three-dimensional structure. Accordingly, the light extraction member of the present invention is easily composited with any other member, is excellent in productivity, is inexpensive, and is also excellent in handleability.

INDUSTRIAL APPLICABILITY

The light extraction member of the present invention may be suitably used in, for example, an image display apparatus, a lighting apparatus, or an electronic signboard.

REFERENCE SIGNS LIST 10 light guide portion
11 first main surface
12 second main surface
20 light output control layer
30 adhesion layer
100 light extraction member
102 light extraction member
103 light extraction member
104 light extraction member

The invention claimed is:

1. A light extraction member, comprising:
 a light guide portion having a first main surface on a light output side and a second main surface opposite to the first main surface;
 a light output control layer arranged in a predetermined pattern over the first main surface of the light guide portion; and
 a light extraction structure arranged on the first main surface side of the light guide portion, the light extraction structure comprising a plurality of convex portions extending away from the first main surface of the light guide portion,
 wherein
 two or more convex portions of the plurality of convex portions are between the light output control layer and the first main surface of the light guide portion and completely covered by the light output control layer in accordance with the predetermined pattern,
 at least one convex portion of the plurality of convex portions is free from being covered by the light output control layer based on the predetermined pattern,
 a refractive index $n1$ of the light guide portion and a refractive index $n2$ of the light output control layer satisfy a relationship of $n1>n2$, and wherein the refractive index $n2$ of the light output control layer is from 1.01 to 1.30,
 the light output control layer is formed of one or a plurality of constituent units each forming a fine pore structure, and the constituent units are chemically bonded to each other through a catalytic action,
 the constituent units of the light output control layer are each of a particle shape, and the particle-shaped constituent units contain microporous particles each containing at least one element selected from the group consisting of Si, Mg, Al, Ti, Zn, and Zr, and
 the microporous particles each contain a pulverized body of a gel-like silica compound.

2. The light extraction member according to claim 1, further comprising a pressure-sensitive adhesive layer as an outermost layer on the light output side, wherein a refractive index $n5$ of the pressure-sensitive adhesive layer, the refractive index $n1$ of the light guide portion, and the refractive index $n2$ of the light output control layer satisfy relationships of $n1>n2$, $n5>n2$, and $n1-n2>n1-n5$.

3. The light extraction member according to claim 2, wherein the pressure-sensitive adhesive layer is arranged to cover the light output control layer and to be in contact with the first main surface of the light guide portion.

4. The light extraction member according to claim 1, wherein the light extraction structure is arranged on a side of the light output control layer opposite to the light guide portion.

5. The light extraction member according to claim 1, wherein a distribution of opening portions defining the pattern of the light output control layer is formed to be denser on a side distant from a light source than on the light source side.

6. The light extraction member according to claim 1, wherein a bond between the constituent units of the light output control layer includes a hydrogen bond or a covalent bond.

7. The light extraction member according to claim 1, wherein the constituent units of the light output control layer each contain an inorganic substance.

8. A light extraction member, comprising:
 a light guide portion having a first main surface on a light output side and a second main surface opposite to the first main surface;
 a light output control layer arranged in a predetermined pattern over the first main surface of the light guide portion, the light output control layer being an applied layer or a printed layer; and
 a light extraction structure arranged on the side of the light output control layer opposite to the light guide portion, the light extraction structure being a light-diffusing layer, the light extraction structure comprising a plurality of convex portions extending away from the first main surface of the light guide portion,
 wherein two or more convex portions of the plurality of convex portions are between the light output control layer and the first main surface of the light guide portion and completely covered by the light output control layer in accordance with the predetermined pattern,
 wherein at least one convex portion of the plurality of convex portions is free from being covered by the light output control layer based on the predetermined pattern,
 wherein a refractive index $n1$ of the light guide portion and a refractive index $n2$ of the light output control layer satisfy a relationship of $n1>n2$,
 wherein the refractive index $n2$ of the light output control layer is from 1.01 to 1.30,
 wherein the light output control layer is formed of one or a plurality of constituent units each having a particle shape, the particle-shaped constituent units contain microporous particles each containing silicon, and the constituent units are chemically bonded to each other through a catalytic action, and
 wherein the microporous particles each contain a pulverized body of a gel-like silica compound.

* * * * *